INVENTOR.
GEORGE A. OLIVE
BY
Charles H. Brown
ATTORNEY

INVENTOR.
GEORGE A. OLIVE
BY
Charles H. Brown
ATTORNEY

INVENTOR.
GEORGE A. OLIVE
BY
Charles H. Brown
ATTORNEY

Aug. 18, 1959 G. A. OLIVE 2,900,459

SINGLE SIDEBAND AMPLIFIER

Filed July 28, 1958 4 Sheets-Sheet 4

INVENTOR.
GEORGE A. OLIVE

BY Charles H. Brown

ATTORNEY 2,900,459
Patented Aug. 18, 1959

2,900,459

SINGLE SIDEBAND AMPLIFIER

George A. Olive, Lawrenceville, N.J., assignor to Radio Corporation of America, a corporation of Delaware Application July 28, 1958, Serial No. 751,251

15 Claims. (Cl. 179—171)

Figure 1:
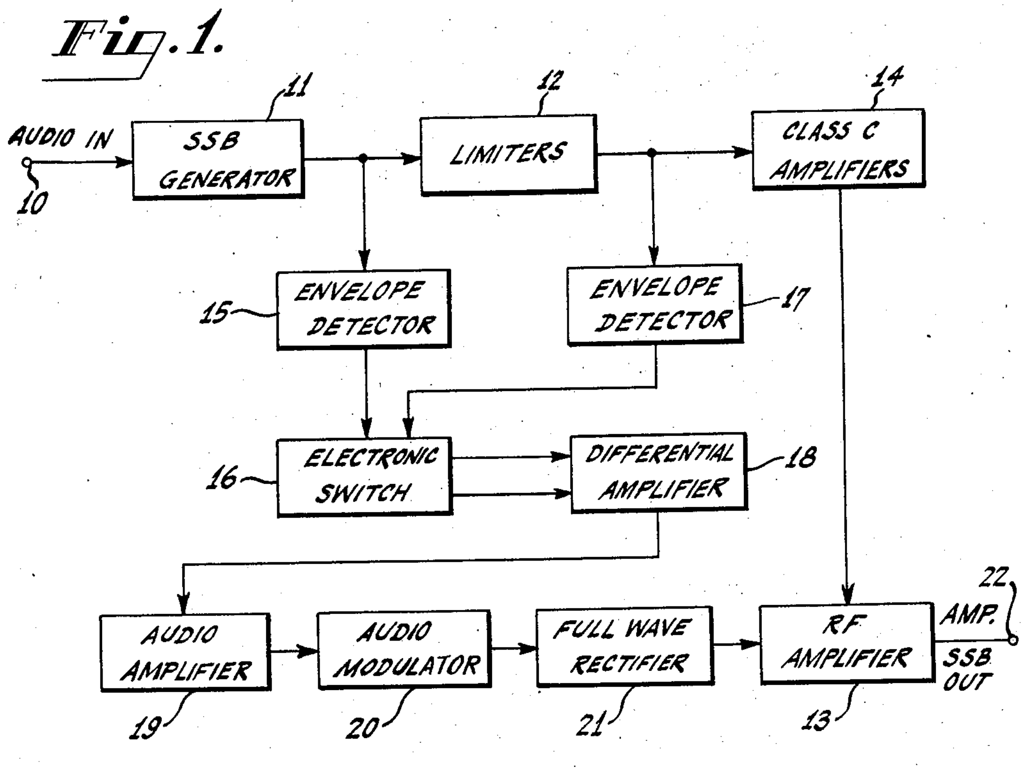

The invention relates to amplifiers and particularly to an amplifier for single sideband signals.

The intelligence in a single sideband signal or wave is transmitted by varying two properties of the transmitted wave, namely the amplitude and the phase. The phase variations carry a large number of sidebands with distinct bundles of energy. The amplitude modulation determines the total energy given to the entire signal at any instant of time, and also neutralizes some of the sidebands and reinforces others.

A single sideband amplifier has been proposed which eliminates the need for complex and costly equipment such as linear radio frequency amplifiers in single sideband transmitters. A portion of a single sideband wave to be amplified is passed through limiting stages, thereby removing the amplitude modulation component and producing the pure phase modulation component. The original single sideband wave amplitude modulation envelope is detected, and the resultant audio frequency wave is amplified. The amplified, amplitude modulation envelope then modulates, in a final stage, the amplified phase modulation component resulting in an amplified copy of the orginal single sideband wave. If the phase and amplitude modulation components are recombined in proper phase and with proper amplitudes, the undesired sidebands of the phase and amplitude modulation components will cancel, reproducing the single sideband wave form. A single sideband transmitter of this type is shown and described in United States Patent 2,666,133, issued to L. R. Kahn on January 12, 1954 for Single Sideband Transmitter.

An object of the invention is to provide an improved single sideband amplifier of the type in which the phase and amplitude modulation components of a single sideband wave are amplified over separate paths and then combined to produce an amplified copy of the original single sideband wave.

Another object is to provide an improved circuit arrangement for amplifying a signal wave of the type in which the sidebands bring the amplitude of the signal wave to zero at regular or irregular intervals as, for example, a suppressed carrier single sideband wave.

Aother object is to provide a novel circuit arrangement for amplifying a suppressed carrier single sideband wave by forming an alternating current wave from the envelope of the single sideband wave, amplifying the alternating current wave, rectifying the amplified alternating current wave to form an amplified copy of the envelope and then modulating the amplified phase modulation component of the single sideband wave with the amplified copy of the envelope to produce an amplified copy of the single sideband wave including the direct current component thereof.

Still another object is to provide a novel amplifier for suppressed carrier single sideband waves including equipment which is simpler and less critical in operation than the equipment used in known systems.

The amplifying arrangement of the invention is adaptable for use in single sideband transmitters of the type in which a single sideband wave is generated including sidebands which bring the amplitude to zero or substantially to zero at regular or irregular intervals. Examples of such single sideband waves are completely or partially suppressed carrier single sideband waves.

Briefly, the objects of the invention are accomplished by an amplifying arrangement in which a portion of a single sideband wave at carrier frequency and of the type defined above is passed through one or more stages of limiters. The limiters function to eliminate the amplitude modulation component or envelope, producing an output wave including only the phase modulation component of the single sideband wave. The phase modulation component is amplified and fed to a final radio frequency amplifier stage. The remaining portion of the single sideband wave is fed to a detector circuit which functions to detect the amplitude modulation component or envelope of the single sideband wave. The envelope is amplified over an alternating current path and fed to the final amplifier stage so as to modulate the amplified phase modulation component, producing an amplified copy of the original single sideband wave.

Alternating current amplifiers provide advantages in that they are less critical in operation and easier to maintain in proper operation than, for example, direct current amplifiers. However, alternating current amplifiers will not pass the direct current component of a signal wave applied thereto but will produce instead an output wave having a substantially constant level, whether the signal wave applied thereto is of a constant level over a given period of time, as in tone transmission, or of a varying level over the given period of time, as in voice transmission. By amplifying the amplitude modulation component or envelope of the single sideband wave over an alternating current path, the advantages of such operation are achieved. However, the operation of the alternating current amplifiers using previously known techniques is such that the direct current component of the envelope would be lost. The retention of the direct current component of the envelope is particularly important in the transmission of signal energy in which the level of the low frequency or direct current component varies, as in voice transmission. Without the retention of the direct current component, it is impossible in such operation to produce at the final amplifier stage a true amplified copy of the original single sideband wave.

In accordance with one embodiment of the invention, the detected amplitude modulation component or envelope is fed to an electronic switch. The phase modulation component appearing at the output of the limiter stage is detected such that a pulse is produced each time the input to the limiter falls below the level of limiting at which time a zero output interval may be said to occur at the output of the limiter. The pulses so produced are fed to the electronic switch. The electronic switch is triggered by each pulse and functions to pass the cycles of the envelope applied thereto alternately over first one and then another path to a differential amplifier. The differential amplifier is responsive to the two wave trains applied thereto to produce an alternating current wave in which the positive going portions thereof correspond to every other cycle of the envelope and the negative going portions correspond to the remaining or in-between cycles of the envelope. The alternating current wave is amplified by audio amplifiers which can be resistance or transformer coupled. The amplified alternating current wave is then rectified by a full wave rectifier. The full wave rectifier inverts the negative going portions of the alternating current wave, thus cancelling the action of the switch and differential amplifier, and thereby produces an amplified replica of the amplitude modulation component envelope, including the direct current component thereof.

The amplified envelope is fed to the final amplifier stage so as to modulate the amplified phase modulation component, resulting in the production by the final amplifier stage of an amplified copy of the original signal sideband wave. A true, amplified copy of the single sideband wave is obtained whether the single sideband transmitter is used to transmit signal energy in which the direct current component is constant over a given period of time, say 0.1 second or more as in tone transmission, or is used to transmit signal energy in which the direct current component varies over the given period of time as in voice transmission.

Figure 3:
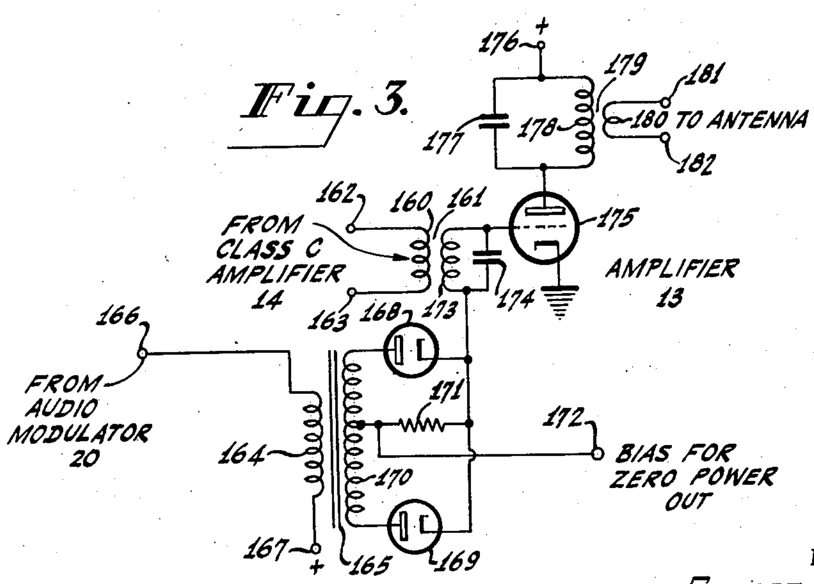
Figure 2A:
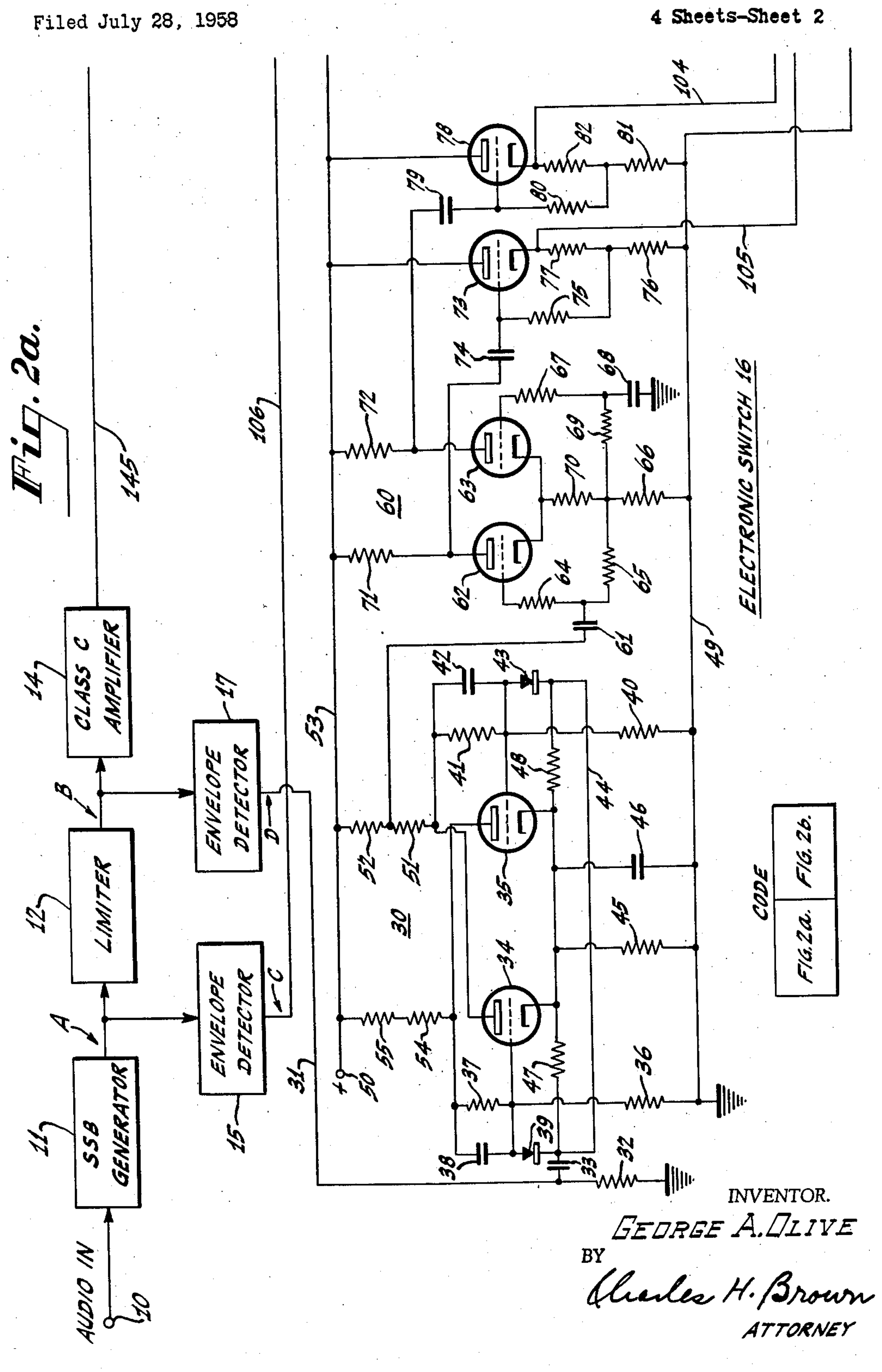
Figure 2B:
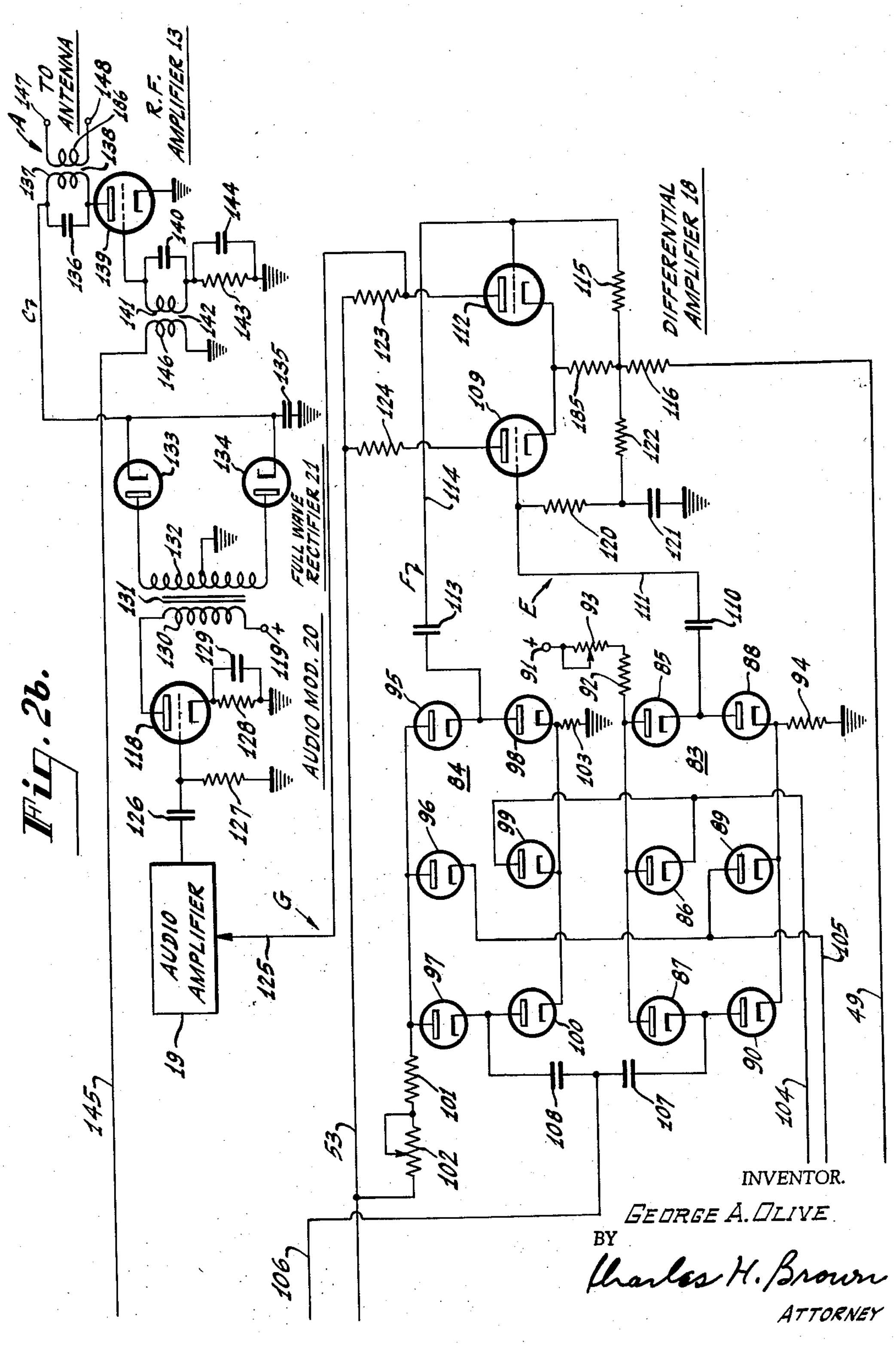
Figure 4:
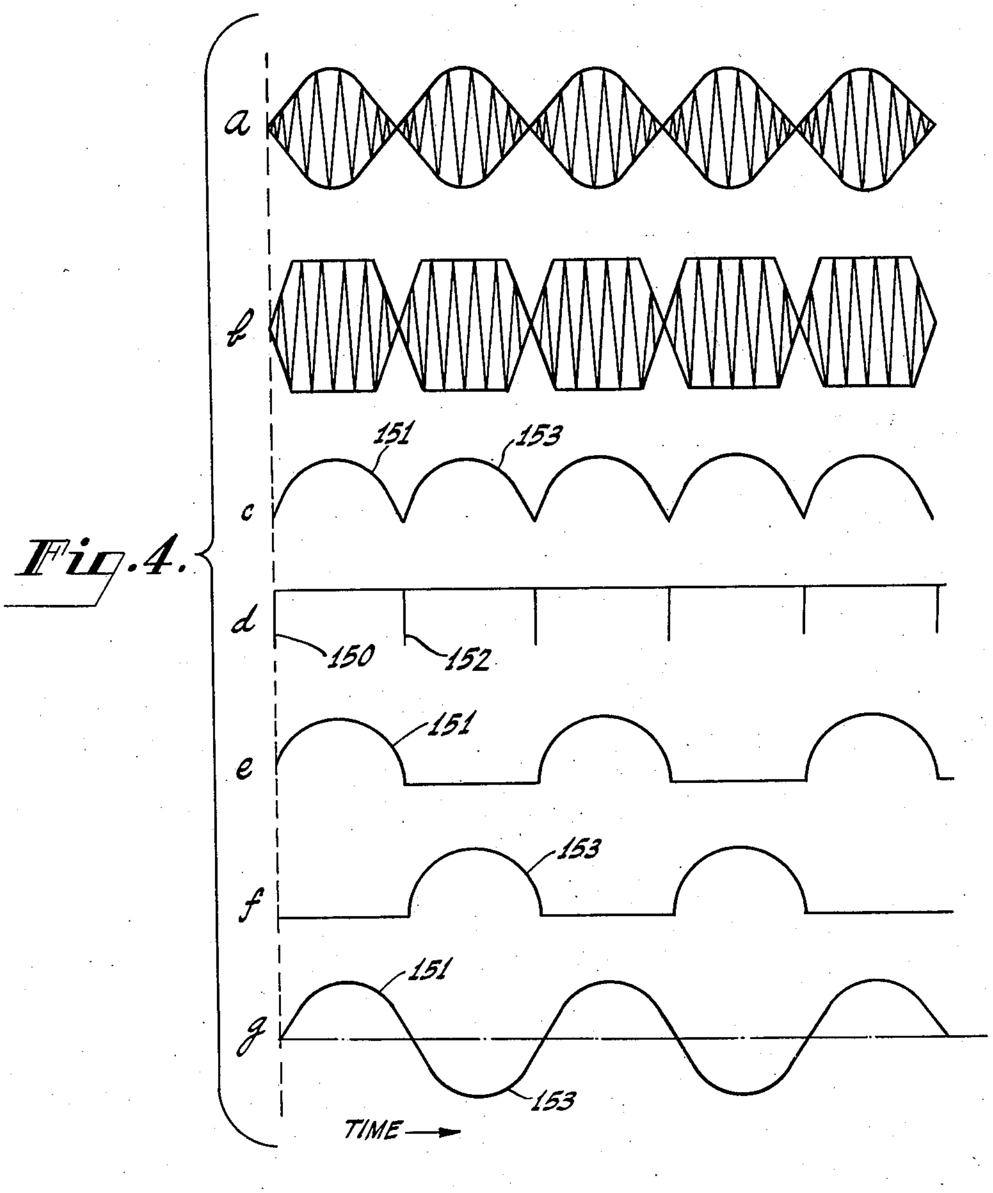

A more detailed description of the invention will now be given with reference to the accompanying drawing, in which Figure 1 is a block diagram of a single sideband amplifier constructed according to the invention;

Figures 2*a* and 2*b* are circuit diagrams of one embodiment of the invention according to the block diagram given in Figure 1;

Figure 3 is a circuit diagram of a modification of the circuit diagram given in Figure 2; and Figure 4 is a series of curves useful in describing the circuit diagram given in Figure 2.

As shown in the block diagram of Figure 1, modulating signal energy of any desired type is applied via an input terminal 10 to an input of a single sideband generator 11. For example, such modulating signal energy may consist of two or more multiplexed audio tones, each of which is shifted in frequency in accordance with the intelligence in the corresponding multiplex channel. The generator 11 produces single sideband tone frequencies from the input audio tones and may consist of one or more balanced modulators supplied with the audio input tones and with locally generated wave energy. Bandpass filters are provided for selecting one or the other of the sidebands produced in the modulators along with frequency translating devices for increasing frequency in the desired amount. The single sideband generator 11 is designed to produce a completely or partially suppressed carrier selected single sideband wave at the final frequency of the single sideband transmitter. For example, the output frequency of the generator 11 may be in the range of 2–100 mc. (megacycles), plus or minus the audio tone frequency according to whether the upper or lower sideband is selected.

The single sideband wave output is fed from the generator 11 to two separate paths or channels. One of the channels is designated as the phase modulation channel and the other channel is designated as the amplitude modulation channel. The phase modulation channel includes one or more stages of limiters 12 to which is fed a portion of the single sideband wave output of the generator 11. The limiters 12 are of conventional design and may be of the type generally known as overdriven amplifiers in which saturation limiting in plate and grid is employed to produce a rectangular wave from a sine wave. The phase modulation component is fed from the limiters 12 to a radio frequency (R.F.) final amplifier 13 through one or more conventional Class C amplifiers 14.

In accordance with the invention, the remaining portion of the single sideband wave output of the generator 11 is fed to the amplitude modulation channel. The amplitude modulation channel includes an envelope detector 15 arranged, for example, as a half-wave diode vacuum tube rectifier. The envelope or amplitude modulation component including the direct current (D.C.) component thereof is fed from the detector 15 to an electronic switch 16.

A portion of the output wave of the limiters 12 is fed to a second envelope detector 17 which may be of the same construction and operation as the envelope detector 15 included in the amplitude modulation channel.

The detector 17 functions to apply a pulse to the electronic switch 16 for each zero output interval in the phase modulation component. The electronic switch 16 is responsive to the pulses applied thereto from detector 17 to alternately pass the cycles of the envelope detected by detector 15 over first one and then another path to a differential amplifier 18. The differential amplifier 18 functions in response to the two wave trains to produce an alternating current wave, the portions of the alternating current wave of one polarity corresponding to every other cycle of the envelope and the portions of the alternating current wave of the opposite polarity corresponding to the remaining or in-between cycles of the envelope. The alternating current wave is fed from the differential amplifier 18 through audio amplifiers 19 and an audio modulator stage 20 to a full-wave rectifier 21. The full-wave rectifier 21 inverts the negative going portions of the amplified alternating current wave, and by this action produces an amplified copy of the envelope including the D.C. component thereof appearing at the output of detector 15. The amplified copy of the envelope is fed from the rectifier 21 to the amplifier 13 so as to modulate the amplified phase modulation component applied to amplifier 13 from the Class C amplifier 14. The amplifier 13 functions to produce at output terminal 22 a true, amplified copy of the single sideband wave appearing at the output of the generator 11.

A circuit diagram of one embodiment of the invention arranged according to the block diagram of Figure 1 is given by way of example in Figure 2. The train of pulses appearing at the output of detector 17 is fed to a bistable multivibrator 30 included in the electronic switch 16 over an electrical path including lead 31, resistor 32 connected to ground and a coupling capacitor 33. The term ground, as used in the specification, is to be understood as referring to any point of fixed or zero alternating current reference potential. The multivibrator 30 includes first and second current conducting devices shown as triode vacuum tubes 34, 35. The control grid of tube 34 is connected to ground through a resistor 36 and to the plate of tube 35 through a resistor 37. A capacitor 38 is connected across the resistor 37. A unidirectional current conducting device shown as a crystal rectifier 39 with the arrow pointing in the direction of current flow is connected between the control grid of tube 34 and capacitor 33.

The control grid of tube 35 is connected to ground through a resistor 40 and to the plate of tube 34 through a resistor 41. A capacitor 42 is connected across resistor 41. A second unidirectional current conducting device shown as a crystal rectifier 43 with the arrow pointing in the direction of current flow is connected between the control grid of tube 35 and the capacitor 33 via a lead 44. The cathodes of tubes 34, 35 are connected together and to ground over an electrical path including parallel-connected resistor 45-capacitor 46 and lead 49. The cathode of tube 34 is connected to the junction of rectifier 39 and capacitor 33 through a resistor 47, while the cathode of tube 35 is connected to the junction of rectifier 43 and capacitor 33 through a resistor 48. The plate of tube 34 is connected to the positive terminal 50 of a source of unidirectional potential over an electrical path including resistors 51, 52 and lead 53, and the plate of tube 35 is connected to the terminal 50 over an electrical path including resistors 54, 55 and the lead 53.

Tubes 34, 35 are thus interconnected in a known manner to form the bistable multivibrator 30. In one stable state, tube 34 conducts and tube 35 is non-conducting. In the second stable state, tube 34 is non-conducting and tube 35 conducts. The multivibrator 30 changes state in response to each pulse applied thereto from the detector 17. An output wave appearing at the junction of resistors 51, 52 in the plate circuit of tube 34 and having leading and trailing edges coinciding in time with the pulses produced by the detector 17 is applied to a phase splitter 60 through a coupling capacitor 61.

The phase splitter 60 includes first and second current conducting devices in the form of triode vacuum tubes 62, 63. The control grid of tube 62 is connected to capacitor 61 through a resistor 64. The junction of resistor 64 and capacitor 61 is connected to ground over an electrical path including resistors 65, 66 and lead 49. The control grid of tube 63 is connected to the junction of resistors 65, 66 over an electrical path including resistor 67, a by-pass capacitor 68 connected to ground and a resistor 69. The cathodes of tubes 62, 63 are connected together and to the junction of resistors 65, 66 and 69 through a resistor 70. The plate of tube 62 is connected to the positive terminal 50 through a resistor 71 and lead 53, while the plate of tube 63 is connected to terminal 50 through a resistor 72 and lead 53. Tubes 62, 63 are arranged by the circuit described for Class A operation and are normally conducting. Upon the application of the output wave to the phase splitter 60 from the multivibrator 30, tube 62 functions to produce an output wave at the plate thereof inverted in polarity with respect to the output wave of multivibrator 30. By cathode action, tube 63 functions to produce an output wave at its plate corresponding in polarity with the output wave of the multivibrator 30. Two output waves appear at the plates of tubes 62, 63 which are one hundred and eighty degrees out of phase with respect to one another.

The output wave appearing at the plate of tube 62 is applied to the control grid of a cathode follower triode vacuum tube 73 over an electrical path including a capacitor 74 and resistors 75 and 76 connected in series to ground via lead 49. The cathode of tube 73 is connected to the junction of resistors 75, 76 through a resistor 77, and the plate of tube 73 is connected to the terminal 50 via lead 53. The output wave appearing at the plate of tube 63 is applied to the control grid of a second cathode follower triode vacuum tube 78 over an electrical path including capacitor 79 and resistors 80, 81 connected in series to ground via lead 49. The cathode of tube 78 is connected to the junction of resistors 80, 81 through a resistor 82, and the plate of tube 78 is connected to terminal 50 via lead 53. Two push-pull output waves of shifting polarity therefore appear at the cathodes of tubes 73 and 78, the two output waves being one hundred and eighty degrees out of phase with respect to one another and having leading and trailing edges coinciding in time with the pulses supplied by the detector 17 at the so-called zero intervals of the phase modulation component.

The electronic switch 16 includes, in addition to the multivibrator 30, phase splitter 60 and cathode followers 73, 78 already described, first and second networks of unidirectional current conducting devices 83, 84. The first network 83 includes six unidirectional current conducting devices shown as diode vacuum tubes 85, 86, 87, 88, 89 and 90. The plates of diodes 85, 86 and 87 are connected together and to the positive terminal 91 of a source of unidirectional potential through a resistor 92 and an adjustable balancing resistor 93. The cathodes of diodes 88, 89 and 90 are connected together and to ground through a resistor 94. The plate of diode 88 is connected to the cathode of diode 85, and the plate of diode 90 is connected to the cathode of diode 87.

The second network 84 is similar to the network 83 and includes six unidirectional current conducting devices shown as diode vacuum tubes 95, 96, 97, 98, 99 and 100. The plates of diodes 95, 96 and 97 are connected together and to the terminal 50 through a resistor 101, an adjustable balancing resistor 102 and lead 53. The cathodes of diodes 98, 99 and 100 are connected together and to ground through a resistor 103. The plate of diode 98 is connected to the cathode of diode 95, and the plate of diode 100 is connected to the cathode of diode 97. The cathode of cathode follower 78 is connected via lead 104 to the cathode of diode 86 in network 83 and to the plate of diode 99 in network 84. The cathode of the cathode follower 73 is connected via lead 105 to the plate of diode 89 in network 83 and to the cathode of diode 96 in network 84.

In addition to the connections to the networks 83, 84 just described, the output of the envelope detector 15 or amplitude modulation component of the single sideband wave produced by the generator 11 is applied to the cathode of diode 87 and the plate of diode 90 in the first network 83 over a first electrical path including a lead 106 and a coupling capacitor 107. The detected envelope is also applied from the detector 15 to the cathode of diode 97 and the plate of diode 100 in the second network 84 over a second electrical path including lead 106 and a coupling capacitor 108.

As will be described, the networks 83, 84 are made alternately conducting in response to the push-pull wave trains applied thereto from the cathode followers 73, 78. This change in the conducting state of the networks 83, 84 occurs at the same rate as do the zero intervals in the phase modulation component at the output of the limiter 12. Upon the network 83 conducting, the cycle of the envelope applied from detector 15 to the network 83 over lead 106 at that time is passed through the network 83 and applied to the control grid of a triode vacuum tube or current conducting device 109 over an electrical path including a coupling capacitor 110 and lead 111. Upon the network 84 conducting, the cycle of the envelope applied to the network 84 from detector 15 at that time is passed through the network 84 and applied to the control grid of a triode vacuum tube or current conducting device 112 over an electrical path including a coupling capacitor 113 and lead 114.

The control grid of tube 112 is connected to ground through series-connected resistors 115, 116 and lead 49. The control grid of tube 109 is connected to the junction of resistors 115, 116 through resistor 120, a by-pass capacitor 121 connected to ground and resistor 122. The plate of tube 112 is connected to terminal 50 through resistor 123 and lead 53, and the plate of tube 109 is connected to terminal 50 through resistor 124 and lead 53. The cathodes are connected together and to ground through resistors 185, 116. By the circuit described, tubes 112, 109 are arranged for Class A operation and are normally conducting. Tubes 109, 112 form the differential amplifier 18. Tube 112 is responsive to each cycle of the envelope applied thereto from network 84 to supply an output wave from the plate thereof to audio amplifier 19 over lead 125 which is of opposite polarity from that of the envelope cycles. Tube 109 responds to each envelope cycle applied thereto to cause by cathode action an output wave from the plate of tube 112 to the audio amplifier 19 over lead 125 in the same polarity as that of the envelope cycles. In this manner, the envelope is formed into an alternating current wave by differential amplifier 18 and applied to one or more audio amplifiers 19.

The audio amplifiers 19 may be conventional resistance or transformer coupled alternating current amplifiers. The amplified alternating current wave is applied from the amplifiers 19 to the control grid of a triode vacuum tube 118 over an electrical path including a capacitor 126 and resistor 127 connected to ground. The cathode of tube 118 is connected to ground through a resistor 128 having a capacitor 129 connected thereacross. The amplified audio or alternating current wave is applied from the plate of tube 118, forming a high power audio modulator 20, to one end of the primary winding 130 of an audio transformer 131, the other end of the winding 130 being connected to the positive terminal 119 of a source of unidirectional potential. The plate of a first unidirectional current conducting device shown as a vacuum tube diode 133 is connected to one end of the secondary winding 132 of transformer 131. The plate of a second unidirectional current conducting device shown as a vacuum tube diode 134 is connected to the other end of the winding 132, the winding 132 being center-tapped to ground. The cathodes of diodes 133, 134 are connected together and to ground through a capacitor 135. Diodes 133, 134 function as the full-wave rectifier 21 to convert the alternating current wave appearing at transformer 131 to a direct current wave corresponding to an amplified copy of the envelope supplied by detector 15. The diodes 133, 134 conduct for alternate cycles of the alternating current wave, the conduction of the diodes being referenced to the zero axis of the alternating current wave. An inversion of the negative going portions of the alternating current wave takes place by the operation of diodes 133, 134 such that the low frequency or direct current component of the envelope is restored.

An amplified copy of the envelope supplied by detector 15 including the direct current component thereof is fed from the output of rectifier 21 to the parallel tuned plate circuit of the final R.F. amplifier 13, the parallel tuned circuit including a capacitor 136 and the primary winding 137 of an output transformer 138. The amplifier 13 includes a triode vacuum tube 139. The cathode of tube 139 is connected to ground, while the control grid thereof is connected to ground through a parallel tuned circuit including a capacitor 140 and secondary winding 141 of a transformer 142, and a resistor 143. A capacitor 144 is connected across resistor 143. The amplified phase modulation component is fed from the output of amplifiers 14 to ground over an electrical path including lead 145 and the primary winding 146 of transformer 142. An antenna or other output circuit is connected to the secondary winding 186 of transformer 138 via terminals 147, 148. Amplifier 13 is thus arranged for plate modulation by the envelope or amplitude modulation component, permitting high power modulation and a high level output. An amplified copy of the single sideband wave including the direct current component thereof produced by generator 11 appears at terminals 147, 148.

In order to provide a more complete understanding of the invention, a typical operation thereof will be described in connection with the curves of Figure 4. The wave forms given in Figure 4 are for two equal tones modulation. The generator 11 functions in response to the two input tones to produce a single sideband wave as shown in the curve of Figure 4A. The limiter 12 eliminates the amplitude modulation component and provides at the output thereof the pure phase modulation component shown in the curve of Figure 4B. Detector 17 is responsive to each crossover point or zero interval in the phase modulation component to produce a pulse. For the sake of description, it is assumed that a train of negative pulses shown in the curve of Figure 4D are so produced and applied to multivibrator 30 via lead 31.

It will be further assumed that at the time of the first negative pulse 150, the multivibrator 30 is in its stable state in which tube 34 is conducting and tube 35 is nonconducting. The application of the negative pulse to the junction of rectifiers 39 and 43, causes diode 39 to conduct. The control grid of tube 34 is driven negative, and the plate of tube 34 goes positive. Positive going voltage is applied from the plate of tube 34 to the control grid of tube 35 through resistor 41. Tube 35 starts to conduct, causing the plate thereof to go negative. This negative going voltage is applied from the plate of tube 35 to the control grid of tube 34 through resistor 37. Tube 34 therefore becomes non-conducting, and tube 35 becomes conducting. The output wave at the plate of tube 34 applied to the phase splitter 60 becomes positive going. The positive going output wave applied to the control grid of tube 62 causes tube 62 to conduct more heavily, and a negative going output wave is applied from the plate of tube 62 to the control grid of cathode follower 73. The cathode follower 73 conducts correspondingly less heavily, and a negative going output wave appears at the cathode thereof.

At the same time, the increase in conduction of tube 62 causes by cathode action tube 63 of the phase splitter 60 to conduct less heavily. The plate of tube 63 goes more positive, and a positive going output wave is applied to the control grid of cathode follower 78. Cathode follower 78 conducts more heavily, and a positive going output wave appears at the cathode thereof. The cathode of cathode follower 78 may be said to be high and the cathode of cathode follower 73 low. In this condition, a positive going output wave is applied over lead 104 to the cathode of diode 86 in network 83 and to the plate of diode 99 in network 84. A negative going output wave is applied over lead 105 to the plate of diode 89 in network 83 and to the cathode of diode 96 in network 84. Diodes 86 and 89 in network 84 are rendered non-conducting, and diodes 96 and 99 in network 84 are conducting. Since diodes 86 and 89 are cutoff, current flows from terminal 91 to ground through resistors 92, 93 and diodes 85, 87, 88 and 90. Diodes 85, 87, 88 and 90 conduct, and network 83 is rendered open. The conduction of diode 99 pulls the cathodes of diodes 98 and 100 positive, and the conduction of diode 96 pulls the plates of diodes 95 and 97 negative. Diodes 95, 97, 98 and 100 are held non-conducting, and network 84 is closed.

Detector 15 produces the envelope or amplitude modulation component shown in the curve of Figure 4C which is applied over lead 106 to the networks 83, 84. Since network 83 is open and network 84 is closed, the next cycle 151 of the envelope following the pulse 150 in time is passed by the network 83 to the control grid of tube 109 in the differential amplifier 18, as shown in the curve of Figure 4E. Tube 109 conducts more heavily. By cathode action, tube 112 conducts less heavily, and the output wave applied to the audio amplifier 19 from the plate of tube 112 becomes positive going with an amplitude corresponding to that of the envelope cycle 151, as shown in the curve of Figure 4G.

Upon the application of the next negative pulse 152 to the junction of diodes 39 and 43 from detector 17, the multivibrator 30 is triggered to its other stable state. Diode 43 conducts, resulting in tube 35 becoming nonconducting and tube 34 becoming conducting. The output wave at the plate of tube 34 goes negative. Tube 62 of the phase splitter 60 conducts less heavily, and tube 63 conducts more heavily. A positive or high condition occurs at the cathode of cathode follower 73, and a negative or low condition occurs at the cathode of cathode follower 78. A positive going output wave is applied over lead 105 to the plate of diode 89 and the cathode of diode 96. A negative going output wave is applied over lead 104 to the cathode of diode 86 and the plate of diode 99. Diodes 96 and 99 are rendered non-conducting, and diodes 86 and 89 are conducting. The conduction of diodes 86 and 89 causes diodes 85, 87, 88 and 90 to be held non-conducting in the manner described above, and the network 83 is closed. Diodes 95, 97, 98 and 100 conduct through resistors 102, 101 and 103, and network 84 is open. The next envelope cycle 153 therefore is passed through the network 84 to the control grid of tube 112 in the differential amplifier 18, as shown in the curve of Figure 4F. Tube 112 conducts more heavily, and the output wave applied to the audio amplifier 19 from the plate of tube 112 becomes negative going with an amplitude corresponding to the amplitude of the envelope cycle 153, as shown in the curve of Figure 4G.

The operation will continue in the manner described. Networks 83 and 84 are alternately opened at the time of the zero intervals occurring in the phase modulation component detected by detector 17. The envelope cycles as shown in the curve of Figure 4C are passed to first tube 112 and then tube 109 of the differential amplifier 18 in the manner shown in the curves of Figures 4F and 4E, respectively. The differential amplifier 18 functions to produce an alternating current wave taking the form of the curve in Figure 4G. The alternating current wave is amplified by amplifiers 19 and then rectified by the full wave rectifier 21. An amplified copy of the envelope including the D.C. component thereof appears at the output of the rectifier 21 and is applied to the final amplifier 13 to which the amplified phase modulation component is also applied.

As is understood in plate modulation, the amplitude modulation component or envelope varies the plate voltage of tube 139, which in turn varies the amplitude or power output of the amplifier 13. The average level of the plate voltage is a function of the average amplitude or D.C. component of the envelope. By setting the values and time constants of the various components and circuits described in a known manner, the time relationship between the phase and amplitude modulation components is maintained, and a high power single sideband wave is produced at the output of the amplifier 13. The amplitude and phase modulation components retain the original phase relationship of the single sideband wave. Under these conditions, sufficient amplitude modulation is effected in the modulated stage 13 to reproduce the form of the single sideband wave, thus cancelling spurious sidebands introduced when the single sideband wave is divided into its two components. The desired single sideband wave, having the same frequency as the single sideband output wave of the generator 11, is selected in the tuned circuit including capacitor 136 and winding 137 and is coupled by means of transformer 138 to an antenna or other communication path via terminals 147 and 148 for transmission to a desired distant location.

While the invention has been described in connection with a two-tone signal, the operation of the invention will be the same should voice or other types of transmission be used. Instead of occurring at regular intervals as shown in Figure 4A for two-tone transmission, the intervals of zero output in the single sideband wave will occur at irregular intervals if voice or similar transmission is used. The pulses will be produced by detector 17 at the irregular intervals to cause the operation of the electronic switch 16 in the manner described. If the average amplitude of the signal energy to be transmitted remains constant over a certain interval of time, say 0.1 second or more, as in a frequency-shifted frequency division multiplex signal, the cancellation of the undesired sidebands in the phase modulated spectrum will take place by means of similar but opposite sideband components produced by the amplitude modulation in the modulated amplifier 13. A proper, amplified copy of the single sideband wave to be transmitted is produced. If, on the other hand, the average amplitude of the amplitude modulation component varies, as in voice transmission, a similar cancellation of the undesired sidebands takes place. This is so because the amplifier 13 is modulated by the amplitude modulation component including the average amplitude or direct current component. The average level of the plate voltage is a function of the average amplitude of the amplitude modulation component. The undesired sidebands will remain balanced at the output of the modulated amplifier 13. An amplified single sideband wave is produced at the output of the modulated amplifier 13 in which the average amplitude varies in exactly the same manner as does the average amplitude of the original single sideband wave at the output of the generator 11, resulting in the transmission of a proper and desirable signal.

A feature of the invention is the use of relatively simple circuits such as resistance or transformer coupled amplifiers to perform single sideband amplification. As all stages are not critical to adjust, the adjustments necessary to maintain the proper time relationship between the phase and amplitude modulation components can be made without great difficulty. In any system which uses parallel channels for transmission of information, phase coincidence in the channels is of prime importance to avoid the production of high spurious radiations. This requirement is readily met by the invention since both channels can be made sufficiently broadband to permit the undistorted passage of the amplitude and phase modulation components therethrough.

Various modifications can be made to the embodiment of the invention shown in Figure 2 without departing from the spirit thereof. Instead of using a differential amplifier 18, a phase inverter may be inserted in the output of one of the networks 83 or 84 and the output of the other network and phase inverter added to produce the waveform shown in the curve of Figure 4G. In the alternative, a phase inverter may be inserted between the detector 15 and the input of one of the networks 83, 84. The outputs of the networks 83, 84 are then merely connected together and added to produce the input wave to the amplifier 19.

While plate modulation is shown in Figure 2 for amplifier 13, the amplifier 13 may also be arranged for grid modulation where, for example, less modulating power, and so on, is desired. The latter arrangement is shown by way of example in Figure 3. The amplified phase modulation component is applied from amplifiers 14 to the primary winding 160 of a transformer 161 via terminals 162, 163. The amplified alternating current wave is applied from audio modulator 20 to one end of the primary winding 164 of a transformer 165 via terminal 166, the other end of the winding 164 being connected to the positive terminal 167 of a source of unidirectional potential. The plates of vacuum tube diodes 168, 169 are connected to the respective ends of the secondary winding 170 of transformer 165. A source of bias potential is connected via tterminal 172 to the center of the winding 170 across a resistor 171 for providing bias for zero power out from the amplifier 13 in the absence of an input signal. The cathodes of diodes 168 and 169 are connected together and to an input parallel tuned circuit including the secondary winding 173 of transformer 161 and capacitor 174.

The amplifier 13 includes a triode vacuum tube 175 having a cathode connected to ground and a control grid connected to the input parallel tuned circuit. The plate of tube 175 is connected to the positive terminal 176 of a source of unidirectional potential through a parallel tuned circuit including a capacitor 177 and the primary winding 178 of a transformer 179. The secondary winding 180 of transformer 179 is connected to the antenna or output circuit via terminals 181 and 182. As is understood in grid-bias modulation, the envelope varies the grid bias, which in turn varies the power output of the amplifier 13. The average level of the grid bias is a function of the average amplitude of the envelope. Sufficient amplitude modulation is effected in the amplifier 13 to reproduce an amplified copy of the original single sideband wave, cancelling spurious sidebands introduced by the division of the single sideband wave into its two components. A single sideband wave having the same frequency as that produced by generator 11 is selected in the tuned plate circuit of tube 175 and transmitted via terminals 181, 182.

What is claimed is:

1. In combination, means for generating a single sideband wave having phase and amplitude modulation components, said amplitude modulation component having an average amplitude component, means connected to the output of said generating means for amplifying only said phase modulation component, means connected to the output of said generating means and responsive to said amplitude modulation component and to the envelope of said phase modulation component to transform said amplitude modulation component into an alternating current wave representative of said amplitude modulation component, rectifying means connected to the output of said transforming means to derive from said alternating current wave an output wave corresponding to an amplified copy of said amplitude modulation component including said average amplitude component, and means connected to the output of said rectifying means and to the output of said amplifying means for modulating the amplified phase modulation component with said output wave to produce an amplified copy of said single sideband wave.

2. In combination, means for generating a single sideband wave having phase and amplitude modulation components, said amplitude modulation component having an average amplitude component, means including a limiter connected to the output of said generating means for amplifying only said phase modulation component, means connected to said amplifying means and responsive to the envelope of said phase modulation component to produce a pulse each time the level of said phase modulation component falls below the level of limiting, means connected to said generating means and to said pulse producing means and responsive to said amplitude modulation component and said pulses to transform said amplitude modulation component into an alternating current wave having peak amplitudes corresponding to the peak amplitudes of said amplitude modulation component, rectifying means connected to the output of said transforming means to derive from said alternating current wave an output wave corresponding to an amplified copy of said amplitude modulation component including said average amplitude component, and means connected to the output of said rectifying means and to the output of said amplifying means for modulating the amplified phase modulation component with said output wave to produce an amplified copy of said single sideband wave.

3. In combination, means for generating a single sideband wave having phase and amplitude modulation components, said amplitude modulation component having an average amplitude component, limiting means connected to the output of said generating means for separating said phase modulation component from said single sideband wave, a first detecting means connected to the output of said limiting means, and responsive to the envelope of said phase modulation component to produce a pulse each time the level of said phase modulation component falls below the level of limiting, a second detection means connected to the output of said generating means for separating said amplitude modulation component from said single sideband wave, switching means connected to the outputs of said first and second detecting means and responsive to said amplitude modulation component and to said pulses to transform said amplitude modulation component into an alternating current wave having peak amplitudes corresponding to the peak amplitudes of said amplitude modulation component, a first amplifying means connected to the output of said limiting means to amplify said limited phase modulation component, a second amplifying means connected to the output of said switching means to amplify said alternating current wave, rectifying means connected to the output of said second amplifying means and responsive to said amplified alternating current wave to produce an output wave corresponding to an amplified copy of said amplitude modulation component including said average amplitude component, and means connected to the output of said first amplifying means and of said rectifying means for modulating the amplified phase modulation component with said output wave to produce an amplified copy of said single sideband wave.

4. A combination as claimed in claim 3, and wherein said modulating means includes an amplifier having a plate circuit connected to the output of said rectifying means and a grid circuit connected to the output of said first amplifying means, said amplifier being arranged for operation as a plate modulated amplifier stage.

5. A combination as claimed in claim 3 and wherein said modulating means includes an amplifier having a grid circuit connected to the output of said rectifying means and to the output of said first amplifying means, said amplifier being arranged for operation as a grid modulated amplifier stage.

6. In combination, means for generating a single sideband wave having phase and amplitude modulation components, said amplitude modulation component having an average amplitude component, means connected to the output of said generating means for amplifying only said phase modulation component, switching means connected to the output of said generating means and responsive to said amplitude modulation component and to the envelope of said phase modulation component to produce two output waves, one of said output waves including every other cycle of said amplitude modulation component and said other output wave including the remaining cycles of said amplitude modulation component, means connected to said switching means and responsive to said output waves to produce an alternating current wave having peak amplitudes corresponding to the peak amplitudes of said amplitude modulation component, rectifying means connected to the output of said alternating current wave producing means to derive from said alternating current wave a third output wave corresponding to an amplified copy of said amplitude modulation component including said average amplitude component, and means connected to the output of said amplifying means and to the output of said rectifying means for modulating the amplified phase modulation component with said third output wave to produce an amplified copy of said single sideband wave.

7. In combination, means for generating a single sideband wave having phase and amplitude modulation components, said amplitude modulation component having an average amplitude component, means including a limiter connected to the output of said generating means for amplifying only said phase modulation component, means connected to said amplifying means and responsive to the envelope of said phase modulation component to produce a pulse each time the level of said phase modulation component falls below the level of limiting, a detecting means connected to the output of said generating means for separating said amplitude modulation component from said single sideband wave, switching means connected to the output of said detecting means and of said pulse producing means for producing two output waves, one of said output waves including every other cycle of said amplitude modulation component and said other output wave including the remaining cycles of said amplitude modulation component, means connected to said switching means and responsive to said output waves to produce an alternating current wave having peak amplitudes corresponding to the peak amplitudes of said amplitude modulation component, a second amplifying means connected to the output of said alternating current wave producing means for amplifying said alternating current wave, rectifying means connected to the output of said second amplifying means to derive from said alternating current wave a third output wave corresponding to an amplified copy of said amplitude modulation component including said average amplitude component, and means connected to the output of said first amplifying means and of said rectifying means for modulating the amplified phase modulation component with said third output wave to produce an amplified copy of said single sideband wave.

8. In combination, means for generating a single sideband wave having phase and amplitude modulation components, said amplitude modulation component having an average amplitude component, limiting means connected to the output of said generating means for separating said phase modulation component from said single sideband wave, a first detecting means connected to the output of said limiting means and responsive to the envelope of said phase modulation component to produce a pulse coinciding in time with each zero interval in said phase modulation component, second detecting means connected to the output of said generating means for separating said amplitude modulation component from said single sideband wave, switching means connected to the output of said first and of said second detecting means to produce a first output wave including every other cycle of said amplitude modulation component and a second output wave including the remaining cycles of said amplitude modulation component, means connected to said switching means and responsive to said first and second output waves to produce an alternating current wave having peak amplitudes corresponding to the peak amplitudes of said amplitude modulation component, first amplifying means connected to said limiting means for amplifying said phase modulation component, a second amplifying means connected to said alternating current wave producing means for amplifying said alternating current wave, rectifying means connected to the output of said second amplifying means to derive from said amplified alternating current wave a third output wave corresponding to an amplified copy of said amplitude modulation component including said average amplitude component, and means connected to the output of said first amplifying means and of said rectifying means for modulating the amplified phase modulation component with said third output wave to produce an amplified copy of said single sideband wave.

9. In combination, means for generating a single sideband wave having phase and amplitude moduelation components, said amplitude modulation component having an average amplitude component, limiting means connected to the output of said generating means to separate said phase modulation component from said single sideband wave, a first detecting means connected to said limiting means and responsive to the envelope of said phase modulation component to produce a pulse each time the level of said phase modulation component falls below the level of limiting, a second detecting means connected to the output of said generating means to separate said amplitude modulation component from said single sideband wave, an electronic switch connected to the output of said first and of said second detecting means and responsive to said pulses to produce a first output wave including every other cycle of said amplitude modulation component and a second output wave including the remaining in-between cycles of said amplitude modulation component, a differential amplifier connected to said electronic switch and responsive to said output waves to produce by inverting the cycles included in one of said output waves an alternating current wave having peak amplitudes corresponding to the peak amplitudes of said amplitude modulation component, a first amplifying means connected to said limiting means for amplifying said phase modulation component, a second amplifying means connected to said differential amplifier for amplifying said alternating current wave, rectifying means connected to said second amplifying means to derive from said amplified alternating current wave a third output wave corresponding to an amplified copy of said amplitude modulation component including said average amplitude component, and means connected to the output of said rectifying means and to the output of said first amplifying means to modulate said amplified phase modulation component with said third output wave to produce an amplified copy of said single sideband wave.

10. A combination as claimed in claim 9 and wherein said electronic switch includes a first and second network to which said amplitude modulation component is applied from said second detecting means, said electronic switch also including means responsive to said pulses produced by said first detecting means to alternately place said networks in conducting condition, whereby said first output wave is produced by said first network and said second output wave is produced by said second network.

11. A combination as claimed in claim 9 and wherein said electronic switch includes first and second networks each including a plurality of unidirectional current conducting devices, means to apply said amplitude modulation component received from said second detecting means to the inputs of said networks, means including a bistable multivibrator and phase splitter responsive to said pulses produced by said first detecting means to produce fourth and fifth output waves one hundred and eighty degrees out of phase with respect to one another and having leading and trailing edges coinciding in time to the times at which the level of said phase modulation component falls below said level of limiting, means to apply said fourth and fifth output waves to said first and second networks to cause first one and then the other of said networks to become conducting, said first network being operated by the alternate conduction thereof to produce said first output wave and said second network being operated by the alternate conduction thereof to produce said second output wave.

12. An amplifier for use in a transmitter of the type designed to generate and transmit a suppressed carrier single sideband wave having phase and amplitude modulation components, said amplitude modulation component including an average amplitude component, said amplifier comprising limiting means responsive to a single sideband wave generated by said transmitter to separate said phase modulation component from the single sideband wave, a first detecting means connected to said limiting means and responsive to the envelope of said phase modulation component to produce a pulse each time the level of said phase modulation component falls below the level of limiting, a second detecting means responsive to the single sideband wave generated by said transmitter to separate said amplitude modulation component from the single sideband wave, an electronic switch connected to the output of said first and of said second detecting means and responsive to said pulses to produce a first output wave including every other cycle of said amplitude modulation component and a second output wave including the remaining in-between cycles of said amplitude modulation component, a differential amplifier connected to said electronic switch and responsive to said output waves to produce by inverting the cycles included in one of said output waves an alternating current wave having peak amplitudes corresponding to the peak amplitudes of said amplitude modulation component, a first amplifying means connected to said limiting means for amplifying said phase modulation component, a second amplifying means connected to said differential amplifier for amplifying said alternating current wave, rectifying means connected to said second amplifying means to derive from said amplified alternating current wave a third output wave corresponding to an amplified copy of said amplitude modulation component including said average amplitude component, and means connected to the output of said rectifying means and to the output of said first amplifying means to modulate said amplified phase modulation component with said third output wave to produce an amplified copy of said single sideband wave.

13. An amplifier as claimed in claim 12 and wherein said modulating means includes a current conducting device having a plate circuit connected to the output of said rectifying means and a grid circuit connected to said first amplifying means, whereby said device is arranged for plate modulation.

14. An amplifier as claimed in claim 12 and wherein said modulating means includes a current conducting device having a grid circuit connected to the output of said rectifying means and to the output of said first amplifying means, whereby said device is arranged for grid modulation.

15. An amplifier for use in a signal producing circuit of the type designed to produce a complex wave having phase and amplitude modulation components, said amplitude modulation component including an average amplitude component, said amplifier comprising means responsive to said complex wave for amplifying only said phase modulation component, means responsive to said amplitude modulation component and to the envelope of said phase modulation component to transform said amplitude modulation component into an alternating current wave representative of said amplitude modulation component, rectifying means connected to the output of said transforming means to derive from said alternating current wave an output wave corresponding to an amplified copy of said amplitude modulation component including said average amplitude component, and means connected to the output of said rectifying means and to the output of said amplifying means for modulating the amplified phase modulation component with said output wave to produce an amplified copy of said complex wave.

References Cited in the file of this patent

UNITED STATES PATENTS

| | | |
|---|---|---|
| 2,569,279 | Barton | Sept. 25, 1951 |
| 2,666,133 | Kahn | Jan. 12, 1954 |
| 2,705,775 | Crosby | Apr. 5, 1955 |
| 2,752,570 | Hall | June 26, 1956 |